UNITED STATES PATENT OFFICE.

ALONZO TEMPLE, OF BRIDGEPORT, CONNECTICUT.

IMPROVED COMPOSITION FOR PREVENTING AND REMOVING INCRUSTATION FROM BOILERS.

Specification forming part of Letters Patent No. 49,569, dated August 22, 1865.

*To all whom it may concern:*

Be it known that I, ALONZO TEMPLE, of Bridgeport, in the county of Fairfield and State of Connecticut, have invented a new and Improved Composition for Removing and Preventing Boiler-Incrustations; and I do hereby declare that the following is a full, clear, and exact description thereof, which will enable those skilled in the art to make and use the same.

My improved composition is composed of thirteen parts terra-japonica and three parts of statice, or marsh-rosemary.

In preparing my improved composition I take a mass of the ordinary terra-japonica of commerce and place the same in a suitable vessel with water, and I then bring the mixture to a boiling-heat, by which the terra-japonica is dissolved. The mixture is then strained while hot. I also dissolve a quantity of statice-root or marsh-rosemary in water and boil and strain it in the same manner. I then combine the two solutions in such proportion that a mixture shall be formed containing, as above stated, thirteen parts of terra-japonica, three parts of statice or rosemary.

The composition presents the consistency of a sirup. The effect thereof, when placed within steam-boilers, is to remove any deposit of scale or incrustation that may have been therein formed, and also to prevent the formation of new scale therein. The presence of the composition also prevents the corrosion of the boiler to which it is applied.

I claim as new and desire to secure by Letters Patent—

The within-described composition, made substantially as described.

ALONZO TEMPLE.

Witnesses:
 M. M. LIVINGSTON,
 C. L. TOPLIFF.